(12) United States Patent
Zhang (10) Patent No.: US 12,185,411 B2
(45) Date of Patent: Dec. 31, 2024

(54) METHOD AND DEVICE FOR DISCONTINUOUS RECEPTION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 339 days.

(21) Appl. No.: 17/882,618

(22) Filed: Aug. 8, 2022

(65) Prior Publication Data
US 2022/0377836 A1    Nov. 24, 2022

Related U.S. Application Data

(63) Continuation of application No. PCT/CN2021/075176, filed on Feb. 4, 2021.

(30) Foreign Application Priority Data

Feb. 19, 2020  (CN) .......................... 202010101717.0

(51) Int. Cl.
  *H04W 76/28*   (2018.01)
  *H04W 92/18*   (2009.01)
(52) U.S. Cl.
  CPC ............ *H04W 76/28* (2018.02); *H04W 92/18* (2013.01)
(58) Field of Classification Search
  None
  See application file for complete search history.

(56) References Cited

U.S. PATENT DOCUMENTS

| | | | |
|---|---|---|---|
| 2014/0198695 A1 | 7/2014 | Batchu et al. | |
| 2022/0377709 A1* | 11/2022 | Zhao | H04W 52/0216 |
| 2023/0055280 A1* | 2/2023 | Hwang | H04W 72/20 |

(Continued)

FOREIGN PATENT DOCUMENTS

| | | |
|---|---|---|
| CN | 101064948 A | 10/2007 |
| CN | 102257859 A | 11/2011 |

(Continued)

OTHER PUBLICATIONS

SR received in application No. PCT/CN2021/075176 dated Apr. 1, 2021.

(Continued)

*Primary Examiner* — Alex Skripnikov (57) ABSTRACT

The present application discloses a method and a device used for DRX. A first node receives K radio signal, K being a positive integer greater than 1; and updates a first timer per candidate slot passed when a value of the first timer is unequal to a first expiration value; or stops a first timer when a value of the first timer is equal to a first expiration value; herein, physical-layer channels occupied by the K radio signals respectively comprise K PSSCHs, and the K radio signals respectively comprise K Destination ID fields, the K Destination ID fields respectively being indicated by K SCIs; active time of the first node comprises time while the first timer is running, the first timer being a DRX-related timer. The present application can avoid misunderstanding of the state of the first timer, thus reducing power consumption and air-interface interferences.

20 Claims, 5 Drawing Sheets

(56) References Cited

U.S. PATENT DOCUMENTS

| | | | | |
|---|---|---|---|---|
| 2023/0063048 A1* | 3/2023 | Fu | .................. | H04W 76/14 |
| 2023/0140680 A1* | 5/2023 | Zhao | .................. | H04L 1/1822 |
| | | | | 370/329 |
| 2023/0337140 A1* | 10/2023 | Miao | .................. | H04L 5/0053 |
| 2023/0345559 A1* | 10/2023 | Li | .................. | H04W 72/02 |

FOREIGN PATENT DOCUMENTS

| | | |
|---|---|---|
| CN | 105519167 A | 4/2016 |
| CN | 105764126 A | 7/2016 |
| CN | 108934191 A | 12/2018 |
| WO | 2017111517 A1 | 6/2017 |

OTHER PUBLICATIONS

SR received in application No. 202010101717.0 dated Apr. 26, 2022.
«3GPP tsg_ran\wg2_rl2» LG Electronics France R2-1908299 Introduction of 5G V2X with NR Sidelink Jun. 13, 2019.

\* cited by examiner

METHOD AND DEVICE FOR DISCONTINUOUS RECEPTION

CROSS REFERENCE TO RELATED APPLICATIONS

This application is the continuation of the International Patent application No. PCT/CN2021/075176, filed on Feb. 4, 2021, which claims the priority benefit of Chinese Patent Application No. 202010101717.0, filed on Feb. 19, 2020, the full disclosure of which is incorporated herein by reference.

BACKGROUND

Technical Field

The present disclosure relates to methods and devices in wireless communications, and in particular to a scheme and a device in a wireless communication system that support Discontinuous Reception.

Related Art

Discontinuous Reception (DRX) is a method commonly used in cellular communications to reduce power consumption of communication terminals and lengthen standby time. A base station manages a DRX-related timer through Downlink Control Information (DCI) or Medium Access Control (MAC) Control Element (CE), and then, controls whether a terminal performs wireless reception in a given subframe.

As a significant application scenario of cellular communications, Vehicle to everything (V2X) helps realize direct communications between two communication terminals.

At the 3rd Generation Partner Project (3GPP) Radio Access Network (RAN) #86 Plenary, a research project of V2X DRX was officially approved.

SUMMARY

In conventional DRX, a base station and a User Equipment (UE) can readily reach a common understanding of whether the UE senses a Physical Downlink Control CHannel (PDCCH) in a slot. Such feature, as inventors find through researches, is being challenged in V2X: a receiving UE is probably sensing useful signals sent by multiple transmitting UEs, so any useful signal sent by any one of the multiple transmitting UEs may have some impact on a DRX timer of the receiving UE and worse still, the lack of coordination between these transmitting UEs makes it easier to cause disagreement between the transmitting UEs and the receiving UE over the understanding of DRX state, so a mechanism is required to avoid such difference.

To address the above problem, the present disclosure provides a solution. It should be noted that the description above only took V2X scenarios as a typical example or application scenario, but the present disclosure also applies to other scenarios confronting similar problems, such as DL transmissions, where similar technical effects can be achieved. Additionally, the adoption of a unified solution for various scenarios, including but not limited to V2X scenarios and DL communications, contributes to the reduction of hardcore complexity and costs. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:
receiving K radio signals, K being a positive integer greater than 1; and updating a first timer per candidate slot passed when a value of the first timer is unequal to a first expiration value; or stopping a first timer when a value of the first timer is equal to a first expiration value;
herein, the K radio signals respectively indicate K expiration values; the K expiration values are used together to determine the first expiration value, the K radio signals respectively comprising K Destination IDs.

In traditional DRX, a UE receives parameters like a first expiration value configured by a single base station, and the base station share a same understanding of the first expiration value with the UE, which means that there is no need for a transmitter of K radio signals to indicate K expiration values that are used together to determine a first expiration value. Therefore, the above method is inventive compared with the prior art.

In one embodiment, the method above can ensure that expiration values indicated by K radio signals are jointly used to determine a first expiration value of the first node, which in turn controls how the first node understand the DRX state, thus making the DRX state of the first node satisfy reception of a signal sent by the transmitter of the K radio signals.

In one embodiment, the first node is a UE.

In one embodiment, the first node is a relay node.

In one embodiment, the first expiration value is a maximum value among the K expiration values.

In one embodiment, the first expiration value is a least common multiple of the K expiration values.

In one embodiment, the K radio signals respectively comprise K pieces of Sidelink Control Information (SCI), the K expiration values respectively being indicated by the K SCIs.

In one embodiment, the K expiration values are respectively provided by expiration value fields in K SCIs.

In one embodiment, the K expiration values are respectively indicated by Period fields or Time resource assignment fields in K SCIs.

In one embodiment, physical-layer channels occupied by the K radio signals respectively comprise K Physical Sidelink Shared CHannels (PSSCHs), the K Destination IDs are respectively K Destination ID fields, and the K Destination ID fields are respectively indicated by the K SCIs.

In one embodiment, transmission channels occupied by the K radio signals respectively comprise K Sidelink Shared Channels (SL-SCHs), the K Destination IDs respectively belonging to K link layer IDs.

The present disclosure provides a method in a second node for wireless communications, comprising:
transmitting a first radio signal, the first radio signal indicating a first candidate expiration value;
herein, the first candidate expiration value is one of K expiration values, K being a positive integer greater than 1; the K expiration values are respectively indicated by K radio signals, and the K expiration values are used together for determining the first expiration value; when a value of a first timer is unequal to the first expiration value, the first timer is updated per candidate slot passed; when a value of a first timer is equal to the first expiration value, the first timer is stopped; the K radio signals respectively comprise K Destination IDs.

In conventional DRX, parameters configured by a single base station are used to determine an expiration value, so it is not compulsory for expiration values sent by K nodes to jointly determine a first expiration value; therefore, the above method is inventive compared with the prior art.

In one embodiment, the first expiration value is a maximum value among the K expiration values.

In one embodiment, the first expiration value is a least common multiple of the K expiration values.

In one embodiment, the K radio signals respectively comprise K pieces of SCI, the K expiration values respectively being indicated by the K SCIs.

Specifically, according to one aspect of the present application, the K expiration values are respectively provided by expiration value fields in K SCIs.

Specifically, according to one aspect of the present application, the K expiration values are respectively indicated by Period fields or Time resource assignment fields in K SCIs.

The present disclosure provides a first node for wireless communications, comprising:
 a first receiver, receiving K radio signals, K being a positive integer greater than 1; and updating a first timer per candidate slot passed when a value of the first timer is unequal to a first expiration value; or stopping a first timer when a value of the first timer is equal to a first expiration value;
 herein, the K radio signals respectively indicate K expiration values; the K expiration values are used together to determine the first expiration value, the K radio signals respectively comprising K Destination IDs.

The present disclosure provides a second node for wireless communications, comprising:
 a second transmitter, transmitting a first radio signal, the first radio signal indicating a first candidate expiration value;
 herein, the first candidate expiration value is one of K expiration values, K being a positive integer greater than 1; the K expiration values are respectively indicated by K radio signals, and the K expiration values are used together for determining the first expiration value; when a value of a first timer is unequal to the first expiration value, the first timer is updated per candidate slot passed; when a value of a first timer is equal to the first expiration value, the first timer is stopped; the K radio signals respectively comprise K Destination IDs.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
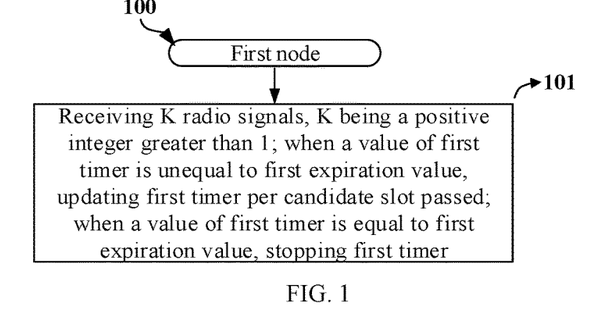
FIG. 1 illustrates a flowchart of receiving K radio signals according to one embodiment of the present disclosure.

Embodiment 1 illustrates a flowchart of receiving K radio signals, as shown in FIG. 1.

In Embodiment 1, the first node 100 receives K radio signals in step 101, K being a positive integer greater than 1; and updating a first timer per candidate slot passed when a value of the first timer is unequal to a first expiration value; or stopping a first timer when a value of the first timer is equal to a first expiration value.

In Embodiment 1, the K radio signals respectively indicate K expiration values; the K expiration values are used together to determine the first expiration value, the K radio signals respectively comprising K Destination IDs.

In one embodiment, the first timer is a drx-InactivityTimer.

In one embodiment, the first timer is an OnDurationTimer.

In one embodiment, the first timer is a Sidelink drx-InactivityTimer.

In one embodiment, the first timer is a Sidelink OnDurationTimer.

In one embodiment, the first timer is maintained in a MAC layer.

In one embodiment, the first timer is maintained by a MAC entity.

In one embodiment, a duration of the candidate slot is fixed to 1 millisecond (ms).

In one embodiment, the candidate slot is a subframe.

In one subembodiment, a number of slots comprised in the candidate slot is related to a subcarrier spacing.

In one embodiment, the candidate slot is a slot.

In one embodiment, the slot comprises 14 multicarrier symbols.

In one embodiment, the slot comprises 12 multicarrier symbols.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Filter-Bank MultiCarrier (FBMC) symbol.

In one embodiment, the action of updating a first timer is to increment a value of the first timer by 1, or to reset the value of the first timer to 0.

In one embodiment, when the first timer is stopped, a value of the first timer is the first expiration value.

In one embodiment, when the first timer is on, a value of the first timer is smaller than the first expiration value.

In one embodiment, an initial value of the first timer is 0.

In one embodiment, the action of updating a first timer is to decrement a value of the first timer by 1, or to reset the value of the first timer to an expiration value.

In one embodiment, when the first timer is stopped, a value of the first timer is 0.

In one embodiment, when the first timer is on, a value of the first timer is greater than 0.

In one embodiment, an initial value of the first timer is the first expiration value.

In one embodiment, the K expiration values are respectively K M1 bits, M1 being a positive integer.

In one embodiment, the M1 is 5.

In one embodiment, the M1 is 8.

In one embodiment, different values indicated by the M1 are respectively mapped to different time-domain offsets.

In one subembodiment, corresponding relations between different values indicated by the M1 and different time-domain offsets are fixed.

In one subembodiment, corresponding relations between different values indicated by the M1 and different time-domain offsets are pre-configured or pre-stored.

In one embodiment, the different values indicated by the M1 are combinations of different bit values.

In one embodiment, the K radio signals respectively comprise K SCIs, the K expiration values respectively being indicated by the K SCIs.

In one embodiment, the K expiration values are respectively indicated by expiration value fields in K SCIs.

In one embodiment, the K expiration values are respectively indicated by Period fields or Time resource assignment fields in K SCIs.

In one subembodiment, the K expiration values are respectively maximum time-domain offsets of time-domain resources indicated by K Time resource assignment fields.

In one subembodiment, the K expiration values are respectively periods indicated by K Period fields.

In one embodiment, the K expiration values are respectively K time offsets.

In one subembodiment, the K time offsets are measured in slots, subframes, frames or milliseconds.

In one embodiment, the K expiration values are respectively K specific times.

In one subembodiment, the K specific times are respectively K slot numbers, K subframe numbers or frame numbers.

In one embodiment, physical layer channels occupied by the K radio signals respectively comprise K PSSCHs.

In one embodiment, physical layer channels occupied by the K radio signals respectively comprise K PSCCHs.

In one embodiment, transmission channels occupied by the K radio signals respectively comprise K SL-SCHs.

In one embodiment, the K radio signals are broadcast.

In one embodiment, the K radio signals respectively comprise K physical layer signalings.

In one embodiment, the K radio signals respectively comprise K higher layer signalings.

In one embodiment, the K Destination IDs are respectively K Destination ID fields, the K Destination ID fields being respectively indicated by the K SCIs.

In one embodiment, relative to indicating a higher-layer Destination Identifier, the above method can reduce the number of bits indicated by first information, thus enhancing spectrum efficiency.

In one embodiment, the K Destination IDs respectively belong to K link layer IDs.

In one subembodiment, the K Destination IDs are respectively K link layer IDs.

In one subembodiment, the K Destination IDs are respectively part of K link layer IDs.

In one subembodiment, the K Destination IDs are respectively K Layer-2 IDs.

In one embodiment, the K Destination IDs are respectively K application layer identifiers.

In one subembodiment, the K application layer identifiers are respectively K ProSe UE IDs.

In one embodiment, the K Destination IDs respectively correspond to K application layer identifiers.

In one subembodiment, corresponding relations between the K Destination IDs and the K application layer identifiers are fixed.

In one subembodiment, respective 16 Least Significant Bits (LSBs) of the K application layer identifiers are respectively the K Destination IDs.

In one subembodiment, respective 24 LSBs of the K application layer identifiers are respectively the K Destination IDs.

In one subembodiment, respective 24 Most Significant Bits (MSBs) of the K application layer identifiers are respectively the K Destination IDs.

In one embodiment, mapping from the K application layer identifiers to the K Destination IDs is completed by ProSe Application in the first node.

In one embodiment, relative to indicating a physical layer Destination Identifier, the method above can rule out configuration error caused by SCI conflicts.

In one embodiment, the K Destination IDs respectively comprise K Y1 bits, where Y1 is a positive integral multiple of 8.

In one embodiment, the K Destination IDs respectively comprise K Y2 bits, where Y2 is a positive integral multiple of 8.

In one embodiment, the Y1 is 8.

In one embodiment, the Y1 is 16.

In one embodiment, the Y1 is 24.

In one embodiment, the Y2 is 16.

In one embodiment, the K Destination IDs are maintained by a first node.

In one embodiment, the K Destination IDs are configured by higher layers of a first node.

In one embodiment, the K Destination IDs are configured by ProSe Application.

In one embodiment, the K radio signals respectively comprise K pieces of configuration information, the K pieces of configuration information respectively being used for configuring K SCIs, the K expiration values respectively indicated by the K pieces of configuration information.

In one embodiment, the K pieces of configuration information are indicated by a higher layer signaling.

In one embodiment, the K radio signals comprise K Media Access Control (MAC) Control Elements (CEs), the K pieces of configuration information respectively being indicated by the K MAC CEs.

In one subembodiment, the K MAC CEs respectively comprise K Destination IDs.

In one embodiment, the K radio signals comprise K Radio Resource Control (RRC) signalings, the K pieces of configuration information respectively being indicated by the K RRC signalings.

In one subembodiment, the K RRC signalings respectively comprise K Destination IDs.

In one embodiment, the K expiration values are respectively indicated by Period fields or Time resource assignment fields in K pieces of configuration information.

In one embodiment, the K expiration values are respectively indicated by expiration value fields in K pieces of configuration information.

In one embodiment, time-frequency resources occupied by the K radio signals are indicated by 1st stage SCI; a HARQ process number and a New Data Indicator (NDI) of the first radio signal are indicated by 2nd stage SCI.

In one embodiment, the first expiration value is a least common multiple of the K expiration values.

In one embodiment, the first expiration value is a maximum value among the K expiration values.

In one embodiment, after receiving each of the K expiration values, the K expiration values are used together for determining a first expiration value.

In one embodiment, the K expiration values respectively correspond to K Destination IDs comprised in the K radio signals.

In one subembodiment, the K radio signals respectively comprise K SCIs, and Destination IDs indicated by Destination ID fields carried by the K SCIs are K Destination IDs corresponding to K expiration values indicated by the K radio signals.

In one subembodiment, the K radio signals respectively comprise K pieces of configuration information, the K pieces of configuration information respectively comprising K Destination IDs and K, where a Destination ID comprised in any one of the K pieces of configuration information respectively corresponds to an expiration value.

In one embodiment, the K radio signals are received on sidelink.

In one subembodiment, the K radio signals are TDM, or FDM or SDM received on the sidelink.

In one embodiment, the first node receives K first radio signals on the sidelink.

In one embodiment, the phrase of receiving K radio signals comprises performing channel decoding in time-frequency resources of a candidate slot and determining whether channel decoding is correct according to Cyclic Redundancy Check (CRC).

In one embodiment, the phrase of receiving K radio signals comprises performing blind decoding and determining whether K SCIs respectively comprised in the K radio signals are monitored according to CRC.

In one embodiment, the phrase of monitoring a target signal comprises: if CRC is not passed, it is determined that a target signal is not received.

In one embodiment, the phrase of monitoring a target signal comprises: if CRC is passed; when an information bit decoded comprises a Destination Identifier of the first node, it is determined that a target signal is received; when a Destination Identifier in an information bit decoded does not comprise a Destination Identifier of the first node, it is determined that a first radio signal is not received.

In one embodiment, if CRC is failed, a target signal is not successfully received by this monitoring; if CRC is passed, an information bit after being through channel decoding is delivered to a higher layer, and it is up to the higher layer to determine whether the target signal is successfully received.

In one embodiment, the candidate slot is configured by a base station.

In one embodiment, the candidate slot is any slot other than a slot in which the first node transits an uplink signal or a sidelink signal.

In one embodiment, a slot satisfying any one of the following conditions belongs to a candidate slot:
being configured to a search space of the first node;
being configured to sidelink transmission.

In one embodiment, there are at least two adjacent said candidate slots being discontinuous in time.

In one embodiment, any two adjacent said candidate slots are continuous in time.

In one embodiment, when a subcarrier bandwidth is 15 kHz, a candidate slot only comprises one slot.

In one embodiment, when a subcarrier bandwidth is L1 times as much as 15 kHz, a candidate slot comprises L1 slots, where L1 is a positive integer greater than 1.

Embodiment 2

Figure 2:
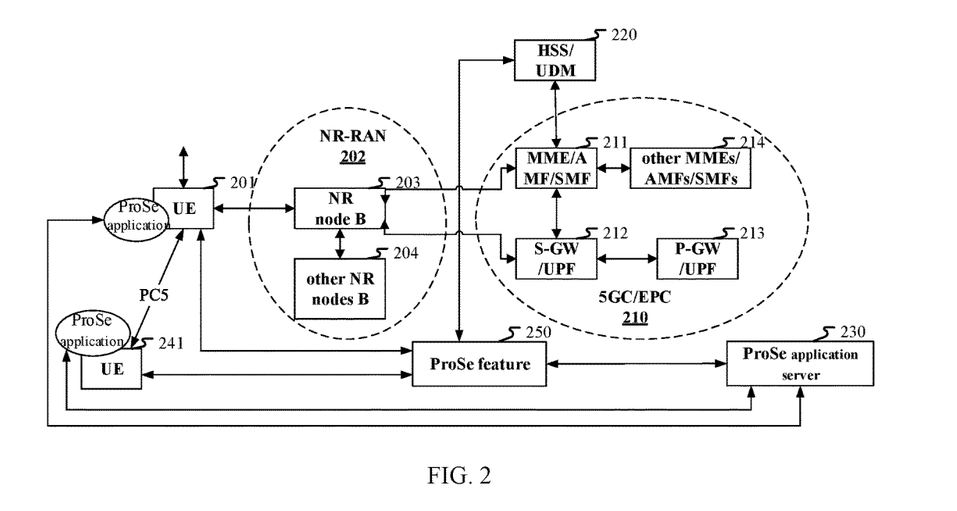
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture under the framework of 5G NewRadio (NR), Long-Term Evolution (LTE) and Long-Term Evolution Advanced (LTE-A) systems. The 5G NR or LTE network architecture may be called a 5G System/Evolved Packet System (5GS/EPS) or other suitable terminology.

The V2X communication architecture in Embodiment 2 may comprise a UE201, a UE241, an NG-RAN 202, a 5G-Core Network/Evolved Packet Core (5GC/EPC) 210, a Home Subscriber Server/Unified Data Management(HSS/UDM) 220, a ProSe feature 250 and a ProSe Application Server 230. The V2X communication architecture may be interconnected with other access networks. For simple description, the entities/interfaces are not shown. As shown in FIG. 2, the V2X communication architecture provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/UserPlane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE201 and the gNB203 are connected by a Uu interface.

In one embodiment, the UE201 and the UE241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is connected with the ProSe application of the UE 201 and the ProSe application of the UE 241 respectively via a PC1 Reference Point.

In one embodiment, the first node in the present disclosure is the UE 201.

In one embodiment, the second node in the present disclosure is the UE 201.

In one embodiment, the first node in the present disclosure is the UE 241.

In one embodiment, the second node in the present disclosure is the UE 241.

In one embodiment, the first node and the second node in the present disclosure are the UE 201 and the UE 241, respectively.

In one embodiment, a radio link between the UE 201 and the UE 241 corresponds to a sidelink (SL) in the present disclosure.

In one embodiment, a radio link from the UE 201 to the NR Node B is an uplink.

In one embodiment, a radio link from the NR Node B to the UE 201 is a downlink.

In one embodiment, the UE 201 supports DRX transmission.

In one embodiment, the UE 241 supports DRX transmission.

In one embodiment, the gNB 203 is a MacroCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station supporting large time-delay difference.

In one embodiment, the gNB 203 is a flight platform.

In one embodiment, the gNB 203 is satellite equipment.

Embodiment 3

Figure 3:
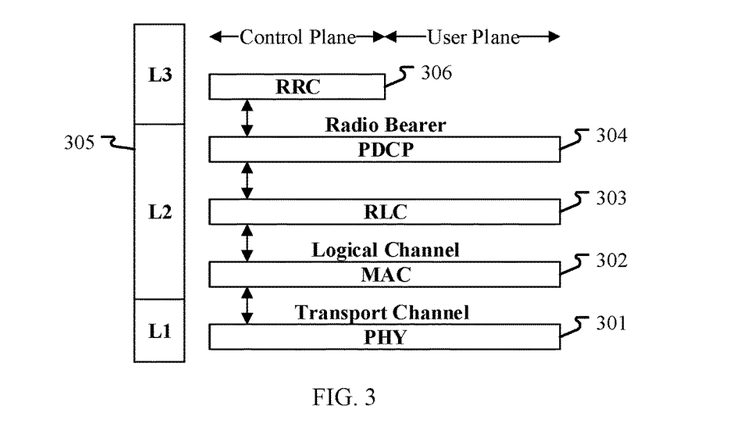
FIG. 3 illustrates a schematic diagram of a radio protocol architecture of a user plane and a control plane according to one embodiment of the present disclosure.

FIG. 3 is a schematic diagram illustrating an embodiment of a radio protocol architecture of a user plane and a control plane. In FIG. 3, the radio protocol architecture for a UE and a gNB is represented by three layers, namely, layer 1, layer 2 and layer 3. The layer 1 (L1) is the lowest layer which performs signal processing functions of various PHY layers. The L1 is called PHY 301, or physical layer in the present disclosure. The layer 2 (L2) 305 is above the PHY 301, and is in charge of the link between a UE and a gNB via the PHY 301. In the user plane, the L2 305 comprises a Medium Access Control (MAC) sublayer 302, a Radio Link Control (RLC) sublayer 303 and a Packet Data Convergence Protocol (PDCP) sublayer 304. All these sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides header compression used for an upper-layer packet for a reduction of radio transmission overhead, provides security by encrypting packets and also support for inter-cell handover of the UE between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transmission channel. The MAC sublayer 302 is also responsible for allocating between UEs various radio resources (i.e., resource block) in a cell. The MAC sublayer 302 is also in charge of HARQ operation. In the control plane, a radio protocol architecture used for the UE and the gNB is almost the same as that for a PHY 301 and a L2 305, but without the functionality of header compression used for the control plane. The control plane also comprises a Radio Resource Control (RRC) sublayer 306 in the L3 layer. The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the L2 305 belongs to a higher layer.

In one embodiment, the RRC sublayer 306 in the L3 belongs to a higher layer.

Embodiment 4

Figure 4:
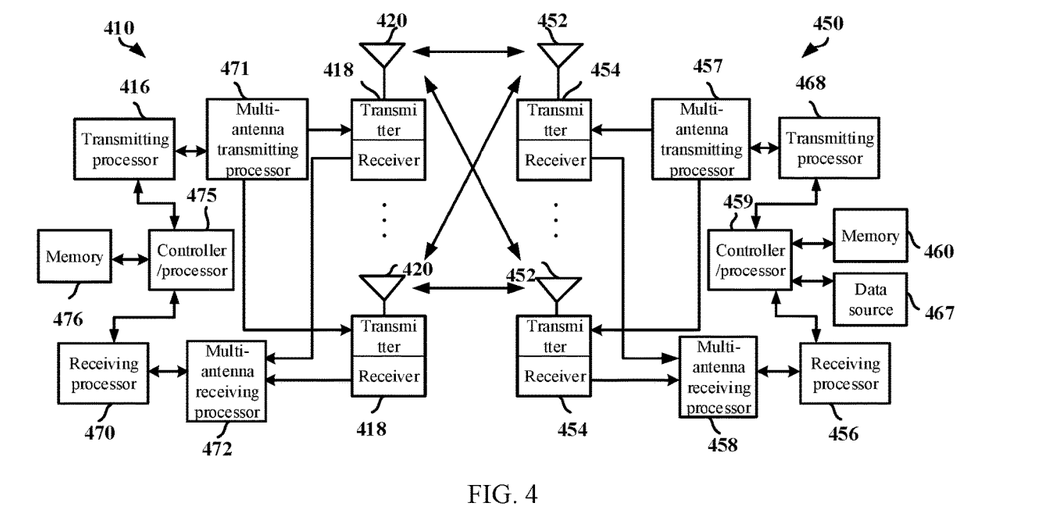
FIG. 4 illustrates a schematic diagram of hardcore modules in a communication node according to one embodiment of the present disclosure.

Embodiment 4 illustrates a schematic diagram of hardcore modules in a communication node according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450—targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication node 410 to the first communication node 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives K radio signals, K being a positive integer greater than 1; and updates a first timer per candidate slot passed when a value of the first timer is unequal to a first expiration value; or stops a first timer when a value of the first timer is equal to a first expiration value; herein, the K radio signals respectively indicate K expiration values; the K expiration values are used together to determine the first expiration value, and the K radio signals respectively comprise K Destination IDs.

In one embodiment, the first communication device 450 comprises a memory that stores computer readable instruction program, the computer readable instruction program generates an action when executed by at least one processor, which includes: receiving K radio signals, K being a positive integer greater than 1; and updating a first timer per candidate slot passed when a value of the first timer is unequal to a first expiration value; or stopping a first timer when a value of the first timer is equal to a first expiration value; herein, the K radio signals respectively indicate K expiration values, the K expiration values are used together to determine the first expiration value, and the K radio signals respectively comprise K Destination IDs.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first radio signal, the first radio signal indicating a first candidate expiration value; herein, the first candidate expiration value is one of K expiration values, K being a positive integer greater than 1; the K expiration values are respectively indicated by K radio signals, and the K expiration values are used together for determining the first expiration value; when a value of a first timer is unequal to the first expiration value, the first timer is updated per candidate slot passed; when a value of a first timer is equal to the first expiration value, the first timer is stopped; the K radio signals respectively comprise K Destination IDs.

In one embodiment, the second communication node 410 comprises a memory that stores computer readable instruction program, the computer readable instruction program generates an action when executed by at least one processor, which includes: transmitting a first radio signal, the first radio signal indicating a first candidate expiration value; herein, the first candidate expiration value is one of K expiration values, K being a positive integer greater than 1; the K expiration values are respectively indicated by K radio signals, and the K expiration values are used together for determining the first expiration value; when a value of a first timer is unequal to the first expiration value, the first timer is updated per candidate slot passed; when a value of a first timer is equal to the first expiration value, the first timer is stopped; the K radio signals respectively comprise K Destination IDs.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the second communication device 410 is a UE.

In one embodiment, the antenna 452, the receiver 454, the multi-antenna receiving processor 458, the receiving processor 456, and the controller/processor 459 are used for receiving K radio signals, K being a positive integer greater than 1.

In one embodiment, the antenna 420, the transmitter 418, the multi-antenna transmitting processor 471, the transmitting processor 416 and the controller/processor 475 are used for transmitting a first radio signal.

Embodiment 5

Figure 5:
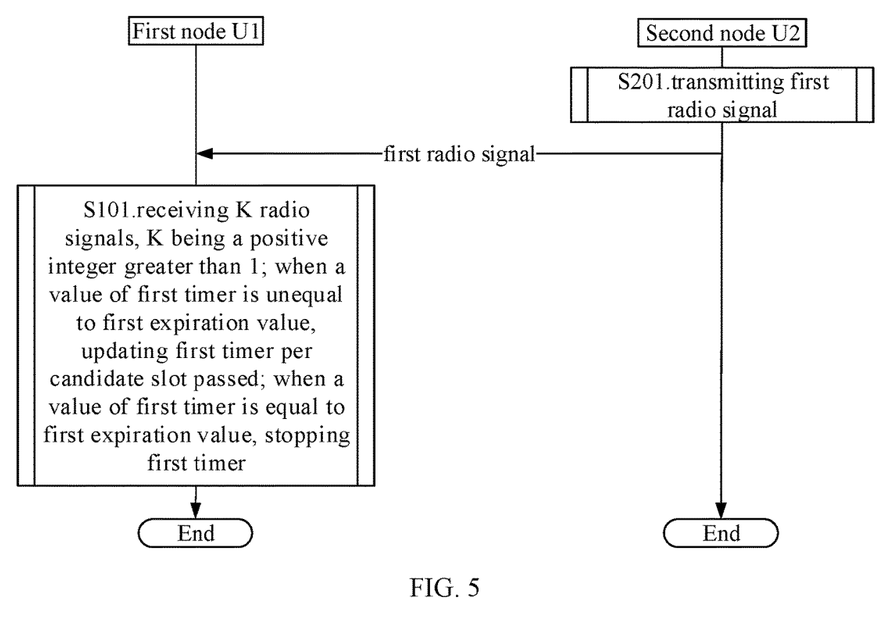
FIG. 5 illustrates a flowchart of transmission between a first node and a second node according to one embodiment of the present disclosure.

Embodiment 5 illustrates a flowchart of transmission between a first node and a second node according to one embodiment of the present disclosure, as shown in FIG. 5.

The first node U1 receives K radio signals in step S101, K being a positive integer greater than 1; and updates a first timer per candidate slot passed when a value of the first timer is unequal to a first expiration value; or stops a first timer when a value of the first timer is equal to a first expiration value.

The second node U2 transmits a first radio signal in step S201, the first radio signal indicating a first candidate expiration value.

In Embodiment 5, the K first radio signals respectively indicate K expiration values, the K expiration values are used together to determine the first expiration value, the K first radio signals respectively comprising K Destination IDs; the first candidate expiration value is one of K expiration values. The first radio signal is a radio signal among K radio signals.

In one embodiment, the first node U1 is a UE, and the second node U2 is a UE.

In one embodiment, the first expiration value is a least common multiple of the K expiration values.

In one embodiment, the first expiration value is a maximum value among the K expiration values.

In one embodiment, the K first radio signals respectively comprise K SCIs, the K expiration values respectively being indicated by K SCIs.

In one embodiment, physical-layer channels occupied by the K radio signals respectively comprise K PSSCHs, the K Destination IDs are respectively K Destination ID fields, and the K Destination ID fields are respectively indicated by the K SCIs.

In one embodiment, characterized in that transmission channels occupied by the K radio signals respectively comprise K SL-SCHs, the K Destination IDs respectively belonging to K link layer IDs.

In one embodiment, the K first radio signals are received on sidelink.

Embodiment 6

Figure 6:
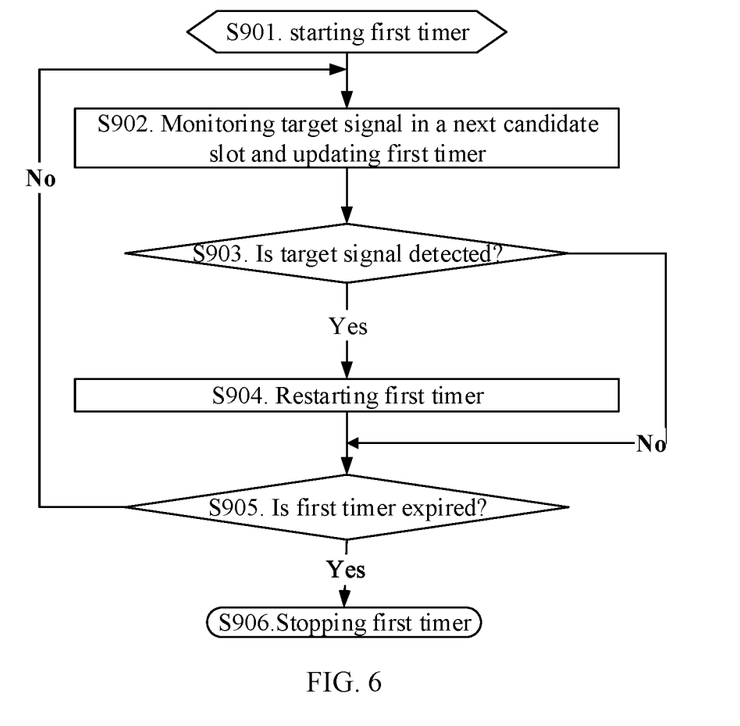
FIG. 6 illustrates a flowchart of utilizing a first timer for time-counting according to one embodiment of the present disclosure.

Embodiment 6 illustrates a flowchart of utilizing a first timer for time-counting according to one embodiment of the present disclosure, as shown in FIG. 6. Steps shown in FIG. 6 are executed in the first node:
  start a first timer in step S901; monitor a target signal in a next candidate slot, and update a first timer in step S902; determine in step S903 whether a target signal is detected; if so, restart the first timer in step S904, if not, determine in step S905 whether the first timer is expired; if so, stop the first timer in step S906; if not, jump to the step S902.

In one embodiment, the first timer is a drx-InactivityTimer.

In one embodiment, the first timer is a Sidelink drx-InactivityTimer.

In one embodiment, the action of starting a first timer is to set the first timer to 0, the action of updating a first timer is to increment a value of the first timer by 1; if the first timer is equal to a first integer, the first timer is expired, otherwise, the first timer is not yet expired.

In one embodiment, the action of starting a first timer is to set the first timer to a first integer, the action of updating a first timer is to decrement a value of the first timer by 1; if the first timer is equal to 0, the first timer is expired, otherwise, the first timer is not yet expired.

In one embodiment, the first integer is fixed.

In one embodiment, the first integer is a first expiration value.

In one embodiment, the next candidate slot is a nearest upcoming slot.

In one embodiment, the next candidate slot is a nearest upcoming slot reserved for V2X or PDCCH.

In one embodiment, a duration of the candidate slot is fixed to 1 millisecond (ms).

In one embodiment, the candidate slot is a subframe.

In one subembodiment, a number of slots comprised in the candidate slot is related to a subcarrier spacing.

In one embodiment, the candidate slot is a slot.

In one embodiment, the slot comprises 14 multicarrier symbols.

In one embodiment, the slot comprises 12 multicarrier symbols.

In one embodiment, the first timer is maintained in a MAC layer.

In one embodiment, the first timer is maintained by a MAC entity.

In one embodiment, when the first timer is running, the first node is in a continuous reception status.

In one embodiment, the target signal carries a Destination Identifier of the first node.

In one embodiment, the target signal comprises a Media Access Control (MAC) Protocol Data Unit (PDU) transmitted on a SideLink Shared CHannel (SL-SCH).

In one embodiment, a channel occupied by the target signal is a PSCCH, the Destination Identifier of the first node being a Destination ID field in SCI.

In one embodiment, the Destination Identifier of the first node comprises Y1 bits, Y1 being a positive integral multiple of 8.

In one embodiment, the Destination Identifier of the first node is part of a link layer identifier maintained by the first node.

In one subembodiment, the Destination Identifier of the first node is part of a Layer-2 destination ID maintained by the first node.

In one embodiment, the Destination Identifier of the first node is a link layer identifier maintained by the first node.

In one subembodiment, the Destination Identifier of the first node is a Layer-2 destination ID maintained by the first node.

In one embodiment, the Destination Identifier of the first node is part of an application layer identifier maintained by the first node.

In one embodiment, the Destination Identifier of the first node U1 is an application layer identifier maintained by the first node.

In one embodiment, the phrase of monitoring a target signal comprises determining whether the target signal is present according to coherent detection of a characteristic sequence.

In one embodiment, the phrase of monitoring a target signal comprises determining whether the target signal is present according to received energy.

In one embodiment, the phrase of monitoring a target signal comprises determining whether the target signal is detected according to Cyclic Redundancy Check (CRC).

In one embodiment, the phrase of monitoring a target signal comprises performing channel decoding in scheduled time-frequency resources and determining whether channel decoding is correct according to Cyclic Redundancy Check (CRC).

In one embodiment, the phrase of monitoring a target signal comprises performing blind decoding and determining whether SCI is monitored according to CRC.

In one embodiment, the phrase of monitoring a target signal comprises: if CRC is not passed, it is determined that a target signal is not detected.

In one embodiment, the phrase of monitoring a target signal comprises: if CRC is passed; when an information bit decoded comprises a Destination Identifier of the first node, it is determined that a target signal is detected; when a Destination Identifier in an information bit decoded does not comprise a Destination Identifier of the first node, it is determined that a first radio signal is not detected.

In one embodiment, if CRC is failed, a target signal is not successfully detected by this monitoring; if CRC is passed, an information bit after being through channel decoding is delivered to a higher layer, and it is up to the higher layer to determine whether the target signal is successfully detected.

In one embodiment, the phrase of monitoring a target signal in a next candidate slot comprises: monitoring the target signal on sidelink; when the target signal is detected on the sidelink, the target signal is considered to be detected in the next candidate slot.

In one embodiment, the sidelink comprises time-frequency resources reserved for a Physical Sidelink Control CHannel (PSCCH).

In one embodiment, the sidelink comprises a scheduled Physical Sidelink Shared CHannel (PSSCH).

In one subembodiment, the phrase of monitoring a target signal comprises decoding a PSSCH, and determining whether the target signal is detected according to a link layer ID carried by a Transport Block (TB) on the PSSCH.

In one embodiment, the sidelink comprises time-frequency resources reserved for a V2X transmission.

In one embodiment, the sidelink comprises time-frequency resources reserved for a Device to Device (D2D) transmission.

Embodiment 7

Figure 7:
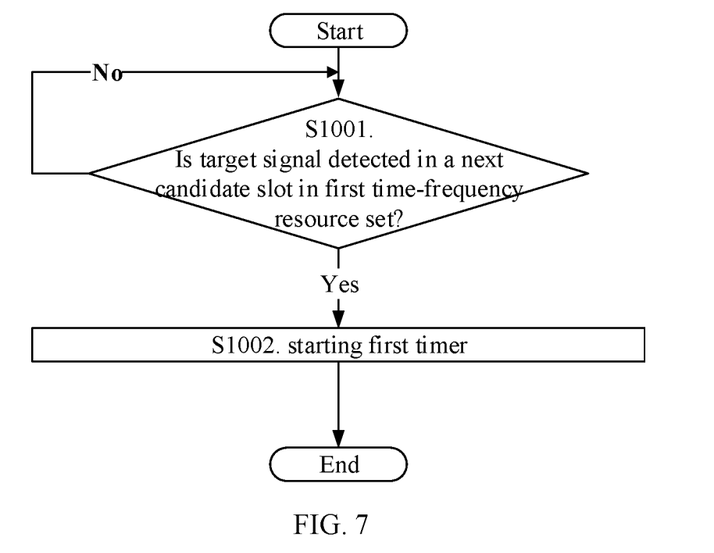
FIG. 7 illustrates a flowchart of starting a first timer according to one embodiment of the present disclosure.

Embodiment 7 illustrates a flowchart of starting a first timer according to one embodiment of the present disclosure, as shown in FIG. 7. Steps shown in FIG. 7 are executed in the first node.

A target signal is monitored in a next candidate slot in a first time resource set in step S1001; if the signal is detected, start a first timer in step S1002, if not, jump back to step S1001.

In one embodiment, the first timer is a drx-InactivityTimer.

In one embodiment, the first timer is a Sidelink drx-InactivityTimer.

In one embodiment, the action of starting a first timer is to set the first timer to 0, the action of updating a first timer is to increment a value of the first timer by 1; if the first timer is equal to a second integer, the first timer is expired, otherwise, the first timer is not yet expired.

In one embodiment, the action of starting a first timer is to set the first timer to a first integer, the action of updating a first timer is to decrement a value of the first timer by 1; if the first timer is equal to 0, the first timer is expired, otherwise, the first timer is not yet expired.

In one embodiment, the second integer is fixed.

In one embodiment, the second integer is a first expiration value.

In one embodiment, the first time resource set is Active Time of the first node.

In one embodiment, the Active Time of the first node includes the time while the first timer is running.

In one embodiment, the Active Time of the first node includes the time while a second timer is running, the time while the second timer is running is configured by a base station.

In one embodiment, the second timer is an OnDurationTimer.

In one embodiment, the second timer is a Sidelink OnDurationTimer.

In one embodiment, the Active Time of the first node includes the time while a Scheduling Request (SR) transmitted by the first node is pending.

In one embodiment, the Active Time of the first node includes the time while there is pending data to be retransmitted.

In one embodiment, the Active Time of the first node includes the time for waiting for a base station to transmit a downlink signaling after successful reception of a Random Access Response (RAR).

In one embodiment, the next candidate slot is a nearest upcoming slot.

In one embodiment, the next candidate slot is a nearest upcoming slot reserved for V2X and staying in Active Time.

In one embodiment, the next candidate slot is a nearest upcoming slot reserved for a same V2X Resource Pool and staying in the Active Time of the first node.

In one embodiment, the phrase of monitoring a target signal in a next candidate slot in a first time resource set comprises: de-monitoring the target signal on sidelink; when the target signal is detected on the sidelink, the target signal is considered to be detected in the first time resource set.

In one embodiment, the phrase of monitoring a target signal comprises: if CRC is passed; when an information bit decoded comprises a Destination Identifier of the first node, it is determined that a target signal is detected; when a Destination Identifier in an information bit decoded does not comprise a Destination Identifier of the first node, it is determined that a first radio signal is not detected.

In one embodiment, if CRC is failed, a target signal is not successfully detected by this monitoring; if CRC is passed, an information bit after being through channel decoding is delivered to a higher layer, and it is up to the higher layer to determine whether the target signal is successfully detected.

In one embodiment, the Destination Identifier of the first node is part of a link layer identifier maintained by the first node.

In one embodiment, the Destination Identifier of the first node is a link layer identifier maintained by the first node.

Embodiment 8

Figure 8:
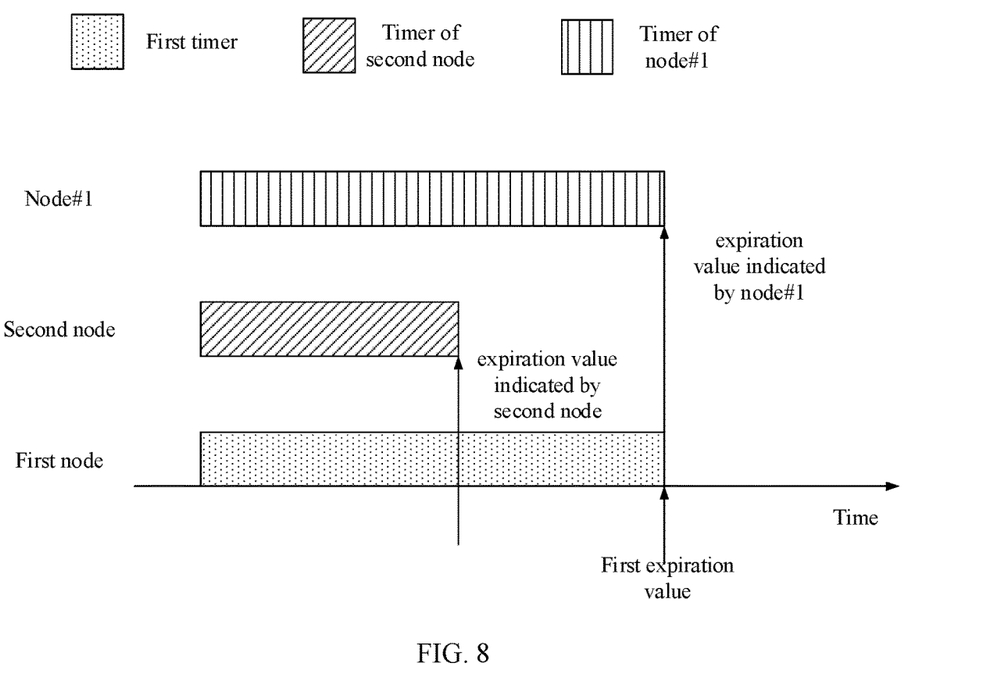
FIG. 8 illustrates a schematic diagram of K expiration values jointly determining a first expiration value according to one embodiment of the present disclosure.

Embodiment 8 illustrates a schematic diagram of K expiration values jointly determining a first expiration value according to one embodiment of the present disclosure, where K is an integer greater than 1, as shown in FIG. 8, where K=2.

In one embodiment, a first expiration value is a maximum value among K expiration values.

In Embodiment 8, a first node respectively receives K=2 expiration values indicated by a second node and a node #1; an expiration value indicated by the node #1 is a maximum value, a first expiration value being an expiration value of the node #1.

In one embodiment, a second node is not required to maintain a counterpart of a first timer.

In one embodiment, an expiration value of a second node can be unequal to a first expiration value.

In FIG. 8, the first node uses a first timer for time counting, updates the first timer per candidate slot passed when a value of the first timer is unequal to a first expiration value; or stops the first timer when a value of the first timer is equal to a first expiration value.

In FIG. 8, the second node uses a timer of the second node, when a value of the timer of the second node is unequal to an expiration value indicated by the second node, the timer of the second node is updated per candidate slot passed; when a value of the timer of the second node is equal to an expiration value indicated by the second node, the timer of the second node is stopped. When the timer of the second node is stopped, the timer of the first node is still running, the first node can receive a radio signal transmitted by the node #1.

In one embodiment, the first timer is a drx-InactivityTimer.

In one embodiment, the first timer is a Sidelink drx-InactivityTimer.

In one embodiment, the first timer is an OnDurationTimer.

In one embodiment, the first timer is a Sidelink OnDurationTimer.

In one embodiment, each of the first node, the second node, the node #1 and the node #2 is a UE.

Embodiment 9

Figure 9:
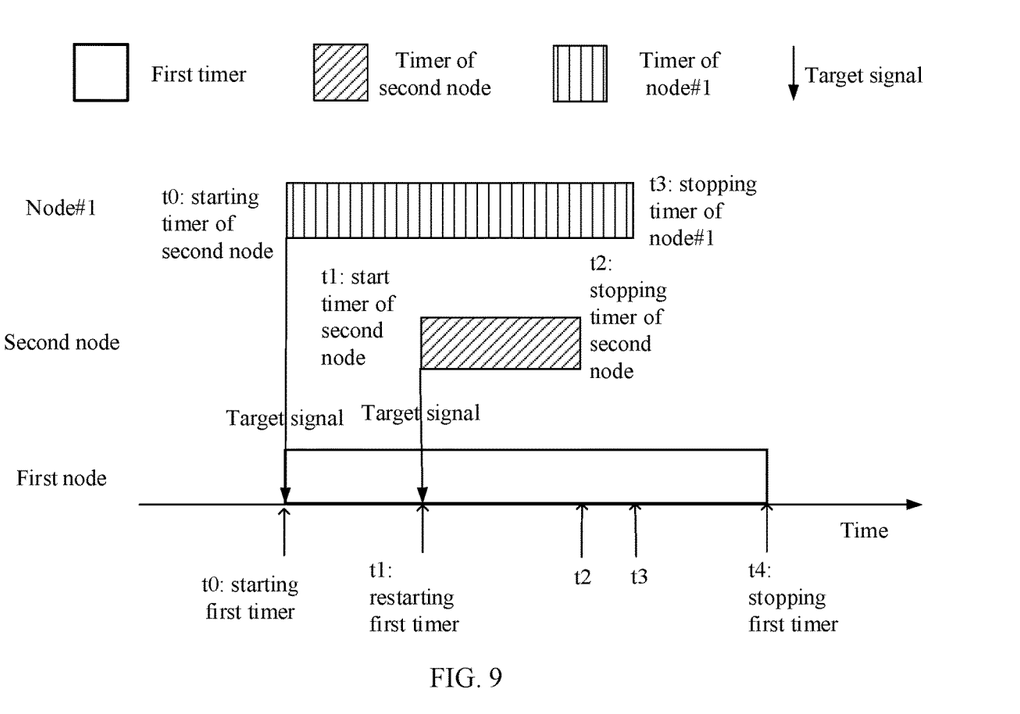
FIG. 9 illustrates a schematic diagram of determining a DRX status of a first node by a first timer according to one embodiment of the present disclosure.

Embodiment 9 illustrates a schematic diagram of determining a DRX status of a first node by a first timer according to one embodiment of the present disclosure, as shown in FIG. 9, where K=2.

In Embodiment 9, a first node respectively receives K=2 expiration values indicated by a second node and a node #1; an expiration value indicated by the node #1 is a maximum value, a first expiration value being an expiration value of the node #1.

In one embodiment, a second node is not required to maintain a counterpart of a first timer.

In one embodiment, an expiration value of a second node can be unequal to a first expiration value.

In one embodiment, a node #1 is not required to maintain a counterpart of a first timer.

In one embodiment, a first node receives a target signal transmitted by a second node and a node #1 in a TD manner.

In FIG. 9, the first node starts a first timer when detecting a target signal at t0; and updates the first timer per candidate slot passed when a value of the first timer is unequal to a first expiration value; the first node restarts a first timer when detecting a target signal at t1; and stops the first timer when a value of the first timer is equal to a first expiration value at t4. The first node can monitor a target signal from t0 to t4.

In FIG. 9, the second node starts a timer of the second node after transmitting a target signal at t0, when a value of the timer of the second node is unequal to an expiration value indicated by the second node, the timer of the second node is updated per candidate slot passed; when a value of the timer of the second node is equal to an expiration value indicated by the second node, the timer of the second node is stopped at t2. The second node is not required to monitor a radio signal transmitted by the node #1, but instead, determines a DRX state of the first node according to an expiration value indicated by itself, and can transmit a target signal to the first node between t1 and t2, thus reducing the complexity.

In FIG. 9, the node #1 starts a timer of the second node after transmitting a target signal at t0, when a value of the timer of the node #1 is unequal to an expiration value indicated by the node #1, the timer of the node #1 is updated per candidate slot passed; when a value of the timer of the node #1 is equal to an expiration value indicated by the node #1, the timer of the node #1 is stopped at t3. The node #1 is not required to monitor a radio signal transmitted by the second node, but instead, determines a DRX state of the first node according to an expiration value indicated by itself, and can transmit a target signal to the first node between t0 and t3, thus reducing the complexity.

In one embodiment, the first timer is a drx-InactivityTimer.

In one embodiment, the first timer is a Sidelink drx-InactivityTimer.

In one embodiment, the first timer is maintained in a MAC layer.

In one embodiment, the first timer is maintained by a MAC entity.

In one embodiment, when the first timer is running, the first node is in a continuous reception status.

In one embodiment, each of the first node, the second node, the node #1 and the node #2 is a UE.

In one embodiment, the target signal carries a Destination Identifier of the first node.

In one embodiment, a first signaling is transmitted by a first node, the first signaling indicating a time of stopping a first timer.

In one embodiment, when the target signal is detected, a first signaling is transmitted.

In one embodiment, a first signaling comprises a source identifier of a second node.

In one embodiment, the source identifier of the second node comprised in the first signaling is an application layer identifier.

In one subembodiment, the application layer identifier is a ProSe UE ID.

In one embodiment, the source identifier of the second node comprised in the first signaling is a link layer identifier.

In one subembodiment, the link layer identifier is a Source Layer-2 ID.

In one embodiment, a channel occupied by the first signaling is a PSSCH, the source identifier of the second node comprised in the first signaling being indicated by a Destination ID field in SCI.

In one embodiment, when a timer of a second node stops, a first signaling is transmitted by a first node.

In one embodiment, a first signaling is transmitted by L3 candidate slot(s) before stopping the timer of the second node, where L3 is an integer no less than 0.

In one embodiment, upon reception of a first signaling, a target signal is transmitted before a stopping time indicated by the first signaling.

In one embodiment, a first signaling comprises a source identifier of a node #1.

Embodiment 10

Figure 10:
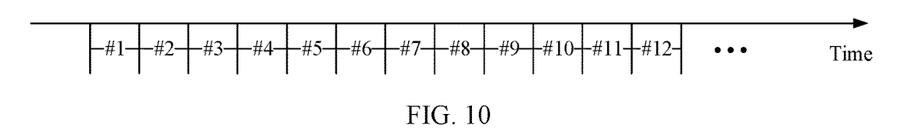
FIG. 10 illustrates a schematic diagram of a candidate slot according to one embodiment of the present disclosure.

Embodiment 10 illustrates a schematic diagram of a candidate slot, as shown in FIG. 10. In Embodiment 10, "#figure" denotes a slot. In Embodiment 10, any two candidate slots are non-overlapping in time.

In one embodiment, any slot among #1, #2, #3 and so on shown in FIG. 10 belongs to a candidate slot.

In one embodiment, a subcarrier spacing configured for a first radio signal is 15 kHz, with a candidate slot only comprising one slot.

In one embodiment, a subcarrier spacing configured for a first radio signal is 30 kHz, with a candidate slot comprising 2 slots.

In one embodiment, a candidate slot only comprises one slot, #1, #5, #9, #13 . . . respectively refer to a candidate slot; other slots are not candidate slots.

Embodiment 11

Figure 11:
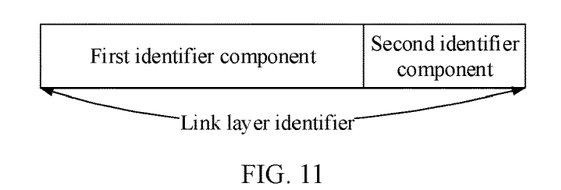
FIG. 11 illustrates a schematic diagram of a link layer identifier according to one embodiment of the present disclosure.

Embodiment 11 illustrates a schematic diagram of a link layer identifier according to one embodiment of the present disclosure, as shown in FIG. 11.

In Embodiment 11, the link layer link consists of a first identifier component and a second identifier component.

In one embodiment, the first identifier component and the second identifier component are respectively comprised of 16 bits and 8 bits.

In one embodiment, the first identifier component and the second identifier component are respectively carried by SCI and a PSSCH.

In one embodiment, the K Destination IDs are respectively K link layer identifiers, where K is an integer greater than 1.

In one embodiment, the K Destination IDs are respectively first identifier components in K link layer identifiers.

Embodiment 12

Figure 12:
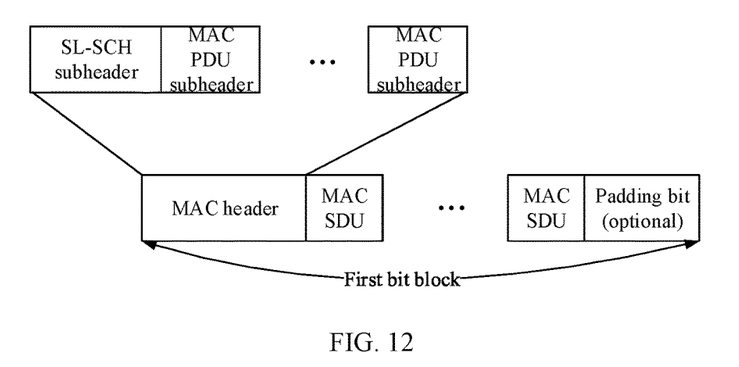
FIG. 12 illustrates a schematic diagram of a first bit block according to one embodiment of the present disclosure.

Embodiment 12 illustrates a schematic diagram of a first bit block according to one embodiment of the present disclosure, as shown in FIG. 12.

In Embodiment 12, the first bit block comprises a MAC header and at least one MAC SDU as well as an optional padding bit; the MAC header comprises an SL-SCH subheader and at least one MAC PDU subheader. The SL-SCH subheader comprises a second identifier component.

In one embodiment, a first radio signal is obtained by a first bit block sequentially through Channel Coding, Scrambling, Modulation, Layer Mapping, Precoding, Resource Mapping, and Multicarrier Symbol Generation.

In one embodiment, a first radio signal is obtained by a first bit block sequentially through CRC Insertion, Channel Coding, Scrambling, Modulation, Resource Mapping, and Multicarrier Symbol Generation.

In one embodiment, a first radio signal is obtained by a first bit block sequentially through Scrambling, CRC Coding, Channel Coding, Re-scrambling, Modulation, Resource Mapping, and Multicarrier Symbol Generation.

In one embodiment, a target signal is obtained by a first bit block sequentially through Channel Coding, Scrambling, Modulation, Layer Mapping, Precoding, Resource Mapping, and Multicarrier Symbol Generation.

In one embodiment, a target signal is obtained by a first bit block sequentially through CRC Insertion, Channel Coding, Scrambling, Modulation, Resource Mapping, and Multicarrier Symbol Generation.

In one embodiment, a target signal is obtained by a first bit block sequentially through Scrambling, CRC Coding, Channel Coding, Re-scrambling, Modulation, Resource Mapping, and Multicarrier Symbol Generation.

Embodiment 13

Figure 13:
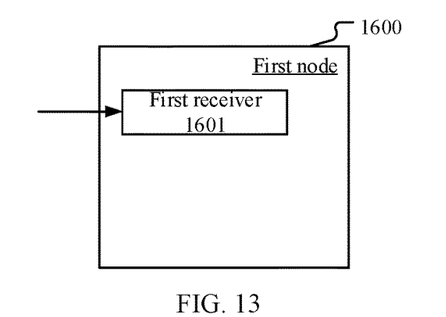
FIG. 13 illustrates a structure block diagram of a processing device used in a first node according to one embodiment of the present disclosure.

Embodiment 13 illustrates a structure block diagram of a processing device used in a first node according to one embodiment of the present disclosure; as shown in FIG. 13. In FIG. 13, a processing device 1600 in a first node comprises a first receiver 1601.

The first receiver 1601 receives K radio signals, K being a positive integer greater than 1; and updates a first timer per candidate slot passed when a value of the first timer is unequal to a first expiration value; or stops a first timer when a value of the first timer is equal to a first expiration value;

In Embodiment 13, the K radio signals respectively indicate K expiration values; the K expiration values are used together to determine the first expiration value, the K radio signals respectively comprising K Destination IDs.

In one embodiment, the first receiver 1601 restarts the first timer when the target signal is detected in a candidate slot, and updates the first timer by 1 when the target signal is not detected in a candidate slot; herein, the first timer is in running state.

In one embodiment, the first node 1600 is a UE.

In one embodiment, the first receiver 1601 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first three of the antenna 452, the receiver 454, the multi-antenna receiving processor 458, the receiving processor 456, the controller/processor 459, the memory 460 and the data source 467 in FIG. 4 of the present disclosure.

Embodiment 14

Figure 14:
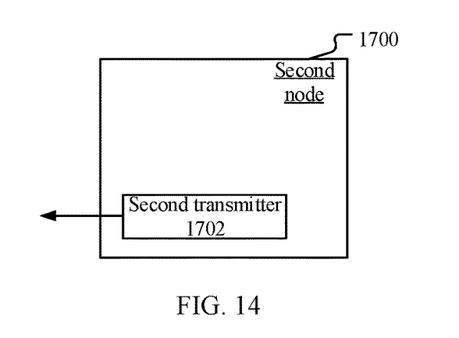
FIG. 14 illustrates a structure block diagram of a processing device used in a second node according to one embodiment of the present disclosure.

Embodiment 14 illustrates a structure block diagram of a processing device used in a second node according to one embodiment of the present disclosure; as shown in FIG. 14. In FIG. 14, a processing device 1700 in a second node comprises a second transmitter 1702.

The second transmitter 1702 transmits a first radio signal, the first radio signal indicating a first candidate expiration value.

In Embodiment 14, the first candidate expiration value is one of K expiration values, K being a positive integer greater than 1; the K expiration values are respectively indicated by K radio signals, and the K expiration values are used together for determining the first expiration value; when a value of a first timer is unequal to the first expiration value, the first timer is updated per candidate slot passed; when a value of a first timer is equal to the first expiration value, the first timer is stopped; the K radio signals respectively comprise K Destination IDs.

In one embodiment, the second node 1700 is a UE.

In one embodiment, the second transmitter 1702 comprises the antenna 420, the transmitter 418, the transmitting processor 416 and the controller/processor 475.

In one embodiment, the second transmitter 1702 comprises the antenna 420, the transmitter 418, the multi-antenna transmitting processor 471, the transmitting processor 416 and the controller/processor 475.

In one embodiment, the second transmitter 1702 comprises the antenna 420, the transmitter 418, the transmitting processor 416 and the controller/processor 475.

In one embodiment, the second transmitter 1702 comprises the antenna 420, the transmitter 418, the multi-antenna transmitting processor 471, the transmitting processor 416 and the controller/processor 475.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving K radio signals, K being a positive integer greater than 1; and updating a first timer per candidate slot passed when a value of the first timer is unequal to a first expiration value; or stopping a first timer when a value of the first timer is equal to a first expiration value;
wherein the K radio signals respectively indicate K expiration values; the K expiration values are used together to determine the first expiration value; physical-layer channels occupied by the K radio signals respectively comprise K PSSCHs, and the K radio signals respectively comprise K Destination ID fields, the K Destination ID fields respectively being indicated by K SCIs; active time of the first node includes the time while the first timer is running, the first timer being a DRX-related timer.

2. The first node according to claim 1, wherein the first expiration value is a maximum of the K expiration values.

3. The first node according to claim 1, wherein the first expiration value is a least common multiple of the K expiration values.

4. The first node according to claim 1, wherein the K radio signals respectively comprise the K SCIs, the K expiration values respectively being indicated by the K SCIs.

5. The first node according to claim 1, wherein transmission channels occupied by the K radio signals respectively comprise K SL-SCHs.

6. The first node according to claim 1, wherein the first timer is a Sidelink OnDurationTimer, or, the first timer is a Sidelink drx-InactivityTimer.

7. The first node according to claim 1, wherein the K radio signals are applicable signals sent from multiple transmitting UEs.

8. The first node according to claim 1, wherein the K radio signals contain K RRC signalings, K pieces of configuration information are respectively indicated by the K RRC signalings, and the K expiration values are respectively indicated by expiration value fields comprised in the K pieces of configuration information.

9. A second node for wireless communications, comprising:
a second transmitter, transmitting a first radio signal, the first radio signal indicating a first candidate expiration value;
wherein the first candidate expiration value is one of K expiration values, K being a positive integer greater than 1; the K expiration values are respectively indicated by K radio signals, and the K expiration values are used together by a receiver of the first radio signal for determining a first expiration value; when a value of a first timer is unequal to the first expiration value, the first timer is updated per candidate slot passed; when a value of a first timer is equal to the first expiration value, the first timer is stopped; the K radio signals respectively comprise K Destination ID fields, the K Destination ID fields respectively being indicated by K SCIs; active time of the receiver of the first radio signal includes the time while the first timer is running, the first timer being a DRX-related timer.

10. The second node according to claim 9, wherein the first expiration value is a maximum of the K expiration values.

11. The second node according to claim 9, wherein the first expiration value is a least common multiple of the K expiration values.

12. The second node according to claim 9, wherein the K radio signals respectively comprise the K SCIs, the K expiration values respectively being indicated by the K SCIs.

13. The second node according to claim 9, wherein the first timer is a Sidelink OnDurationTimer, or, the first timer is a Sidelink drx-InactivityTimer.

14. The second node according to claim 9, wherein the K radio signals contain K RRC signalings, K pieces of configuration information are respectively indicated by the K RRC signalings, and the K expiration values are respectively indicated by expiration value fields comprised in the K pieces of configuration information.

15. A method in a first node for wireless communications, comprising:
receiving K radio signals, K being a positive integer greater than 1; and updating a first timer per candidate slot passed when a value of the first timer is unequal to a first expiration value; or stopping a first timer when a value of the first timer is equal to a first expiration value;
wherein the K radio signals respectively indicate K expiration values; the K expiration values are used together to determine the first expiration value; physical-layer channels occupied by the K radio signals respectively comprise K PSSCHs, and the K radio signals respectively comprise K Destination ID fields, the K Destination ID fields respectively being indicated by K SCIs; active time of the first node includes the time while the first timer is running, the first timer being a DRX-related timer.

16. The method in the first node according to claim 15, wherein the first expiration value is a maximum of the K expiration values.

17. The method in the first node according to claim 15, wherein the first expiration value is a least common multiple of the K expiration values.

18. The method in the first node according to claim 15, wherein the K radio signals respectively comprise K SCIs, the K expiration values respectively being indicated by the K SCIs.

19. The method in the first node according to claim 15, wherein the first timer is a Sidelink OnDurationTimer, or, the first timer is a Sidelink drx-InactivityTimer.

20. The method in the first node according to claim 15, wherein the K radio signals contain K RRC signalings, K pieces of configuration information are respectively indicated by the K RRC signalings, and the K expiration values are respectively indicated by expiration value fields comprised in the K pieces of configuration information.

* * * * *